Patented Jan. 7, 1941

2,228,159

UNITED STATES PATENT OFFICE 2,228,159

MANUFACTURE OF CATION-EXCHANGING BODIES

Hans Wassenegger, Dessau in Anhalt, Robert Griessbach, Wolfen, Kreis Bitterfeld, and Walther Sütterlin, Bitterfeld, Germany, assignors to I. G. Farbenindustrie Aktiengesellschaft, Frankfort-on-the-Main, Germany No Drawing. Application July 9, 1937, Serial No. 152,784. Renewed May 11, 1940. In Germany July 14, 1936

2 Claims. (Cl. 260—49)

Our present invention relates to a process for manufacturing new cation-exchanging bodies and more particularly to such compounds being of resinous structure and deriving from condensation products produced by acting with an aldehyde upon hydroxybenzenes.

Other objects of our invention are the new cation-exchangers.

An additional object of our invention comprises the process for exchanging or removing cations from diluted aqueous solutions.

Further objects of our invention will be seen from the detailed specification following hereafter.

It is well known in the art that condensation products made by acting with aldehydes upon polyhydroxy-benzenes may be used as cation-exchangers. Corresponding compounds made from monohydroxybenzene and its homologous compounds are not applicable for this purpose.

Now we have found that cation-exchangers of outstandingly good properties are producible from monohydroxy-benzene, its homologous compounds or its alkali metal salts, if acid groups are introduced into the molecule by a suitable treatment with sulfites, bisulfites or $SO_2$. These products have nothing in common with the well known artificial tanning agents made from hydroxybenzene-aldehyde condensation products, since according to our present invention the condensation and acidification is carried out under such conditions that water-insoluble products are formed. By a suitable adjustment of the amounts of sulfite and aldehyde the desired insoluble reaction products are formed in any case, the most suitable amount to employ with the particular monohydroxybenzene being easily determinable by a few simple comparative experiments.

The formation of a resin even occurs if 0.7 mol. $SO_3''$ are added per mol. hydroxybenzene, the condensation products becoming insoluble in water as necessary for exchanging bodies by after-treatment with, for instance, hydrochloric acid. This after-treatment with an acid is suitable likewise in the production of resins having a somewhat lower acid character. The treatment with a sulfite can be carried out during or after the formation of the monohydroxybenzene-aldehyde resins, the manufacture of the endproducts being possible even when carrying out the condensation and treatment with a sulfite in several stages.

We assume that in our process $\omega$-sulfonic acids of the hydroxybenzene are formed, and, in fact, these $\omega$-sulfonic acids may be used per se as starting materials.

The examples following hereafter serve to illustrate our invention, the parts being by weight, if not indicated otherwise.

*Example 1.*—216 parts of meta-hydroxytoluene and 252 parts of sodium sulfite are heated for 8 hours to 100° C. together with 500 parts of water and 200 parts of a formaldehyde solution of 30 per cent. strength. Then a further amount of 650 parts of meta-hydroxytoluene dissolved with 60 parts of caustic soda in 250 parts of water is added to the reaction mixture together with 800 parts of a formaldehyde solution of 40 per cent. strength. After boiling for about 1 hour, the solution solidifies to a solid gel which is dried at 80° C. After reduction to small pieces it is a valuable product for exchanging cations.

*Example 2.*—1500 parts of a resin disintegrated to form grains of 0.5 to 2 mm. diameter and produced by condensation of a solution of 1880 parts of hydroxybenzene, 200 parts of caustic soda in 3000 parts of water together with 2200 parts by volume of a formaldehyde solution of 40 per cent. strength are boiled for an hour under reflux together with a solution of 256 parts of sodium sulfite and 200 parts of a solution of formaldehyde of 30 per cent. strength in 2000 parts of water. Then the resin is separated from the solution and washed with water. The material exhibits good properties of exchanging cations.

*Example 3.*—A solution of 1500 parts of hydroxybenzene and 504 parts of sodium sulfite in 1500 parts of water and 400 parts of a formaldehyde solution of 30 per cent. strength are boiled under reflux for 8 hours. After addition of a further amount of 2000 parts by volume of a formaldehyde solution of the same concentration the solution solidifies when heated for 20 hours to 95 to 100° C. The product thus obtained is dried at 75 to 80° C. and when reduced to small pieces is an excellent cation-exchanging material.

*Example 4.*—376 parts of hydroxybenzene are introduced into a solution of 504 parts of sodium sulfite in 1000 parts of water and 400 parts by volume of a formaldehyde solution of 30 per cent. strength and then boiled under reflux for 12 hours. In the solution thus obtained there are dissolved at 90 to 100° C. a further amount of 1128 parts of hydroxybenzene dissolved in 540 parts of water and 120 parts of caustic soda and then at boiling temperature, while stirring, 2000 parts by volume of a formaldehyde solution of 30 per cent. strength are introduced within an hour. Boiling is continued for about 3 hours, the solution solidifying under formation of a gel which is reduced to small pieces after having been allowed to stand for 15 hours at 100° C. and is dried at 75 to 80° C.

When using the exchange-bodies produced according to this example, for removing the hardness of tap water of 22° hardness (German degrees), the material takes up 2.7 per cent. of CaO calculated on its own weight.

Example 5.—940 parts of hydroxybenzene and 340 parts of sodium sulfite are dissolved in 1400 parts of water and 1700 parts of a formaldehyde solution of 40 per cent. strength. The solution is heated for 40 hours to 90 to 100° C. Then the solution solidifies and the gel formed becomes hard. After drying at 75 to 80° and reduction to small pieces, the material is a very good cation-exchanger which when used for removing the hardness of water, shows a capacity of about 3 per cent. by weight (calculated on CaO).

Example 6.—940 parts of hydroxybenzene are boiled for 10 hours under reflux with a solution of 1260 parts of sodium sulfite in 2500 parts of water and 1000 parts of formaldehyde solution of 30 per cent. strength. To this solution there is added a further amount of 400 parts of hydroxybenzene and 2000 parts of a formaldehyde solution of 30 per cent. strength and the whole is heated for 24 hours to 100° C. During this time the solution solidifies and becomes hard. After drying at 80° C. and comminution the resin is boiled for 2 hours with hydrochloric acid of about 20 per cent. strength. It is separated from the liquid and washed until neutral. It may be used as a cation-exchanging body in a neutral or acid medium.

It is obvious that our invention is not limited to the foregoing examples or to the specific details given therein. Various modifications and changes in details are considered to be within the spirit of this invention and the scope of the claims following hereafter. Thus, for instance, it is well known in the art that aliphatic aldehydes other than formaldehyde may be used for manufacturing resins with phenolic compounds and, in fact, we likewise may substitute the formaldehyde wholly or partly by its homologous compounds capable to resinify hydroxybenzene. As pointed out above, $\omega$-sulfonic acids of monohydroxybenzene prepared in a separate process, may be used as starting materials. This variation is not limited to the use of $\omega$-methylene sulfonic acids, but here likewise the homologous compounds derived from another alkyl radicle may be chosen for the resinification. The quantities of the reacting substances may be varied within certain limits, whereat care is to be taken that the end-product is insoluble in water, an increased water-solubility being caused by a plurality of —$SO_3H$-groups introduced into the molecule. As pointed out, resin formation occurs even if 0.7 mol. $SO_3''$ are present in the reaction mixture per mol. hydroxybenzene, but generally we prefer to use no more than about 0.5 mol. $SO_3''$. In order to diminish the swelling of the resins when contacted with water, an after-treatment with an acid while heating, for instance, with hydrochloric acid, sulfuric acid etc. is suitable.

In the claims following hereafter, the term "mono-hydroxybenzene" is intended to include the homologous compounds thereof which are the obvious equivalents of $C_6H_5OH$.

What we claim is:

1. The process of producing water-insoluble cation-exchanging bodies which comprises treating a monohydroxybenzene formaldehyde condensation product during its formation with an aqueous solution of an alkali metal salt of sulfurous acid in the presence of formaldehyde at a temperature up to the boiling point, in this reacting mixture the ratio between monohydroxybenzene and $SO_3''$ equals 1: from 0.25 to 0.5 and continuing heating until the mass solidifies to a gel which is dried at about 80° C.

2. Water-insoluble monohydroxybenzene-formaldehyde condensation products containing in their molecule $\omega$-sulfonic acid radicles, said products exhibiting cation-exchanging properties and being obtainable according to the process covered by claim 1.

HANS WASSENEGGER.
ROBERT GRIESSBACH.
WALTHER SÜTTERLIN.